(No Model.)
C. MADSON.
HARVESTER RAKE.
No. 283,409. Patented Aug. 21, 1883.
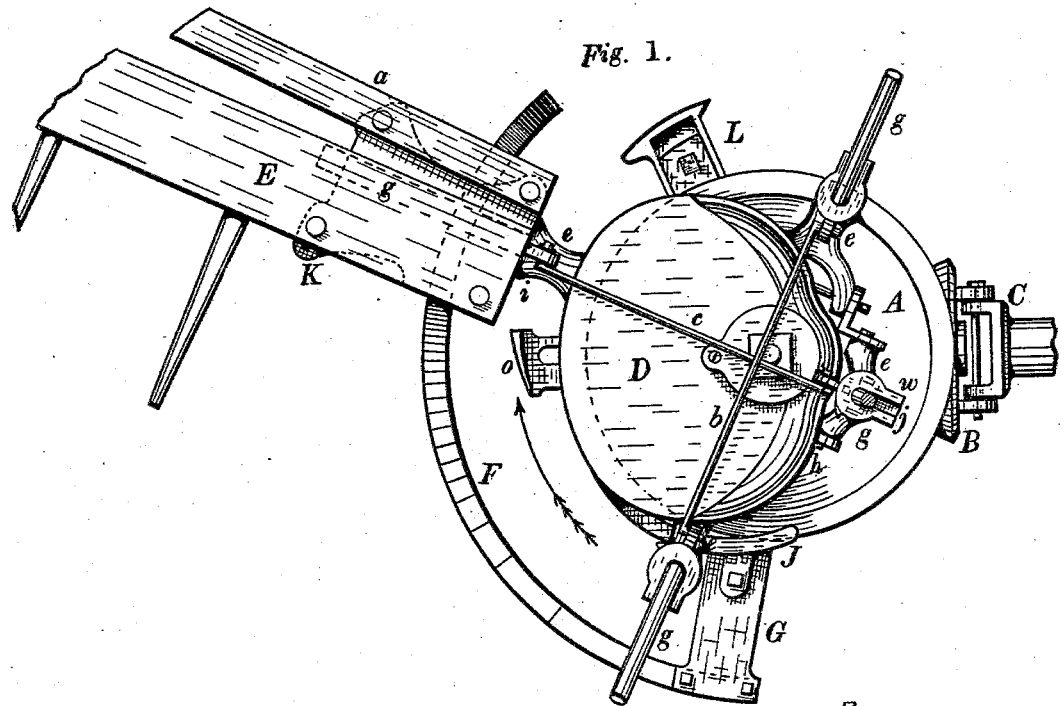
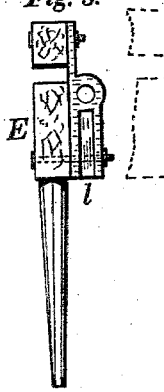
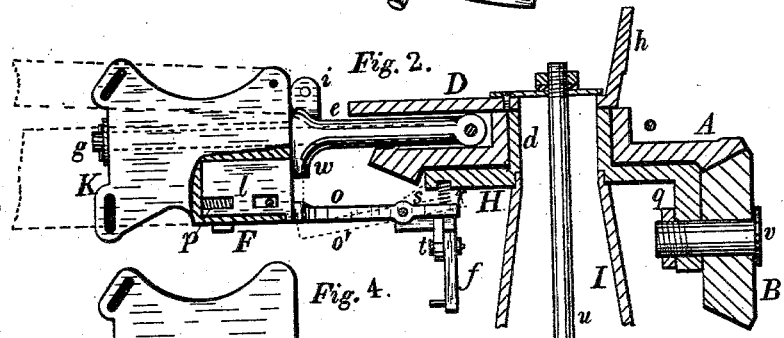
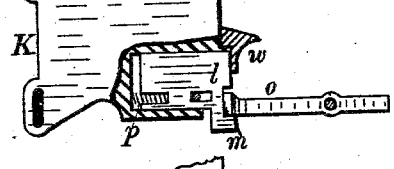
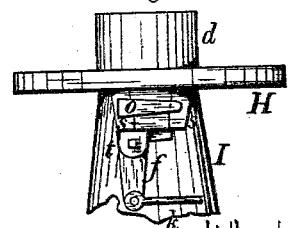
WITNESSES=
H. G. Phillips.
W. H. Walker.
INVENTOR=
Cornelius Madson,
by Geo. B. Selden,
Atty.

UNITED STATES PATENT OFFICE.

CORNELIUS MADSON, OF OSLO, WISCONSIN, ASSIGNOR TO RICHARD T. TUTTLE, OF PERRY, NEW YORK.

HARVESTER-RAKE.

SPECIFICATION forming part of Letters Patent No. 283,409, dated August 21, 1883.

Application filed June 6, 1881. (No model.)

*To all whom it may concern:*

Be it known that I, CORNELIUS MADSON, of Oslo, Manitowoc county, Wisconsin, have invented an Improvement in Harvester-Rakes, of which the following is a specification, reference being had to the annexed drawings.

My invention relates to an improved device for unlatching rakes in harvesters, whereby all the rakes are placed fully under the control of the driver; and my invention consists in an improved latch provided with a projecting lug and a notch or recess on its inner edge, arranged to operate in connection with a movable trip, so that the rake is unlatched when the trip comes in contact with the lug, but remains latched when the point of the trip passes through the notch or recess, all as hereinafter more fully described.

My improvement in harvester-rakes is represented in the accompanying drawings, in which—

Figure 1 is a plan view of a portion of a rake and the rake-operating mechanism. Fig. 2 is a vertical central section of the rake-operating mechanism in a line parallel with the finger-bar, showing the rake-arm and rake-head in elevation, the latter being represented as partially broken away to show the latch. Fig. 3 is an end view of the rake-head and rake as seen from the inner end. Fig. 4 is an elevation of the rake-head, partially in section, to show my improved latch. Fig. 5 represents the same parts, as shown in Fig. 4, in a different position. Fig. 6 is an elevation of the rake-supporting standard, as seen from the left hand in Fig. 1, representing the trip and the bent lever for operating the same.

In the accompanying drawings, A is the bevel-gear, on the upper side of which the rakes are pivoted, in the usual manner. I is the standard, which supports the rake-operating mechanism, and which is attached to the platform of the harvester between the inner end of the finger-bar and the driving-wheel, as customary with this class of machines. The gear A revolves on a hub, $d$, on the circular plate H, which is fitted to the upper end of the standard I. The cam D, provided with the flange $h$, by which the rakes are raised and lowered while revolving with the gear A, is fitted to the upper end of the hub $d$, the whole structure being secured together and to the platform by the threaded rod $u$. The bevel-gear A is rotated by the pinion B, connected by suitable universal couplings, C, with the main driving-wheel. The pinion B revolves on a stud, $v$, inserted in a lug, $q$, projecting downward from the plate H. (See Fig. 2.) The rake-arms $e$ $e$ are pivoted to the upper side of the bevel-gear at their inner ends, and provided at their outer ends with rod $g$ $g$, on which the rake-heads K turn freely. The rake is attached to the rake-head, and consists, preferably, of the bar E, provided with teeth, and the bow $a$. The opposite rakes are connected together by rods $b$ $c$, Fig. 1, fitted in lugs $i$ $i$ on the rake-arms. A suitable curved guide, J, may be employed to assist the cam D in securing the proper motion of the rakes. Each rake-arm is provided with a lug, $w$, having on its outer face the slot, $j$, Fig. 1, with which the latch $l$ engages for the purpose of preventing the turning or feathering motion of the rake. The latch $l$ slides freely in a slot in the rake-head, being pressed outward by the spring $p$, Figs. 2, 4, and 5.

The operation of the rake is placed under the control of the driver by means of the trip $o$, which, when in the position shown by the full lines in Fig. 2, forces the latch $l$ into the slot in the rake-head, thereby unlatching the rake from the rake-arm and allowing its teeth to be turned horizontally, as shown in Fig. 1, by the curved spring F. When, however, the driver wishes the rake to act in sweeping a bundle off from the platform of the harvester, the trip $o$ is depressed, as shown in the dotted lines $o'$, Fig. 2, in which case the latch $l$ remains engaged with the slot $j$ in the rake-arm, and the rake is not allowed to feather. A stationary trip, L, may be employed to feather the rake as the bundle leaves the platform. The trip $o$ is pivoted in jaws $s$ $s$, depending from the lower side of the plate H, its inner end being pressed downward by the spring $r$, Fig. 2. A bent lever, $f$, pivoted to a lug, $t$, raises the inner end of the trip when a treadle placed in any suitable location on the machine is depressed by the driver, the motion being conveyed by the rod k, Fig. 6, and any suitable connecting mechanism.

It is obvious that in a machine constructed as above described each one of the four rakes will feather unless the trip is depressed by the driver. It has been customary to fasten one of the rakes rigidly to the rake-arm, the latch being cut away or removed, so that this "set" rake would sweep the grain from the platform every time it revolved. My invention relates to a device by which this rake is placed under the control of the driver; and it consists in providing the latch l with a notch and a downwardly and inwardly projecting lug, m, which operates to unlatch the rake only when the trip o is depressed, as represented by the full lines in Fig. 5. My improved device enables the driver to prevent the rake to which it is attached from raking at any time he chooses by depressing the trip, so that the latch is forced back by the lug m coming in contact with the trip, thereby allowing the rake to feather. When not depressed, or in the positions shown at o, Fig. 4, and o'', Fig. 5, the trip passes through the notch in the latch and the rake remains latched to the rake-arm, and consequently sweeps the grain from the platform.

My improved latch may be used on more than one or on all the rakes, if desired.

It is obvious that instead of arranging the latch l to slide in the rake-head K, it may be made solid therewith, and the rake-head and rake itself may be constructed to slide lengthwise on the rod g, for the purpose of unlatching the rake, being forced backward by a spring on the outer end of arm g.

I claim—

The combination, with a harvester-rake, of the movable trip o and the latch l, provided with lug m, and having a notch on its inner edge, through which the outer end of the trip passes when the rake remains locked, substantially as and for the purposes set forth.

CORNELIUS MADSON.

Witnesses:
CHAS. SALAK,
MARTIN R. MADSON.